Jan. 26, 1960

C. W. KAY 2,922,860

AUTOMATIC HEADLIGHT BEAM CONTROL

Filed April 29, 1957

INVENTOR.
Charles W. Kay
BY
R. E. Fowler
ATTORNEY

Jan. 26, 1960

C. W. KAY 2,922,860

AUTOMATIC HEADLIGHT BEAM CONTROL

Filed April 29, 1957

INVENTOR.
Charles W. Kay
BY
R. E. Fowler
ATTORNEY

United States Patent Office 2,922,860
Patented Jan. 26, 1960

2,922,860
AUTOMATIC HEADLIGHT BEAM CONTROL

Charles W. Kay, Kokomo, Ind., assignor to General Motors Corporation, Detroit, Mich., a corporation of Delaware Application April 29, 1957, Serial No. 655,897

6 Claims. (Cl. 200—97)

This invention relates to automatic switching means and more particularly to automatic timed switching control means adapted to be connected to a light controlled multi-filament lamp circuit to introduce a distinguishing or characteristic signal during automatic light controlled operation. Many highway vehicles having conventional high and low beam filament headlamps are currently also supplied with automatic light sensitive control means to switch from high beam to low beam illumination upon the approach of the lights of a vehicle from the opposite direction, and return to high beam when the light source is removed and the vehicle has passed. Ordinarily this dimming action is accomplished manually by the driver. It is advantageous, however, to advise the approaching driver when a vehicle is equipped with automatic light controlled means for switching between high and low beam positions.

It is therefore an object in making this invention to provide means for advising approaching drivers when the headlamps of a vehicle are under automatic control.

It is a further object in making this invention to provide means for introducing a characteristic or distinguishing beam energization to advise approaching drivers that the car is equipped with automatic dimming apparatus.

It is a still further object in making this invention to provide means to associate with automatic light controlled apparatus to introduce a distinguishing signal to indicate the use of such means.

It is yet a further object in making this invention to provide a compact power relay assembly for switching the headlamps from bright to dim under the control of the light actuated system in which is incorporated certain signal-producing means.

With the above and other objects in view, my invention will be best understood by reference to the following specification and drawings, in which.

In previous light controlled multi-filament headlamp circuits, the light sensitive control unit operated a power relay which accomplished the actual switching between the upper and lower beam filaments of the headlamps. In these circuits, the upper beam filaments were energized as long as no vehicles were approaching from the opposite direction. Upon the approach of a vehicle and the increase in light impinging upon the light sensitive control elements reaching a certain intensity, the power relay was caused to switch to deenergize the upper beam filaments and to energize the lower beam filaments. In order to indicate to the approaching driver that the vehicle headlights were under automatic control, it was considered desirable to introduce some kind of characteristic operation or signal. Thus the approaching driver would be aware of the automatic operation. A circuit for accomplishing such a characteristic signal or salute is shown and described in co-pending application S.N. 563,291 filed February 3, 1956 in the name of Kenneth S. Vogt entitled, Salute Control for Automatic Headlight Dimmer System and now Patent No. 2,786,963, issued Mar. 26, 1957. In that case the headlamps instead of being switched simultaneously from high to low beam energization, were switched in sequence, one headlamp remaining on high beam a somewhat longer period than the other and then later being depressed. This produced a winking or blinking appearance to the approaching driver which produced the charactedistic identifying signal.

The present control relay is provided to produce the same type of sequential switching from upper to lower beam in the right and left headlamps.

Figure 1:
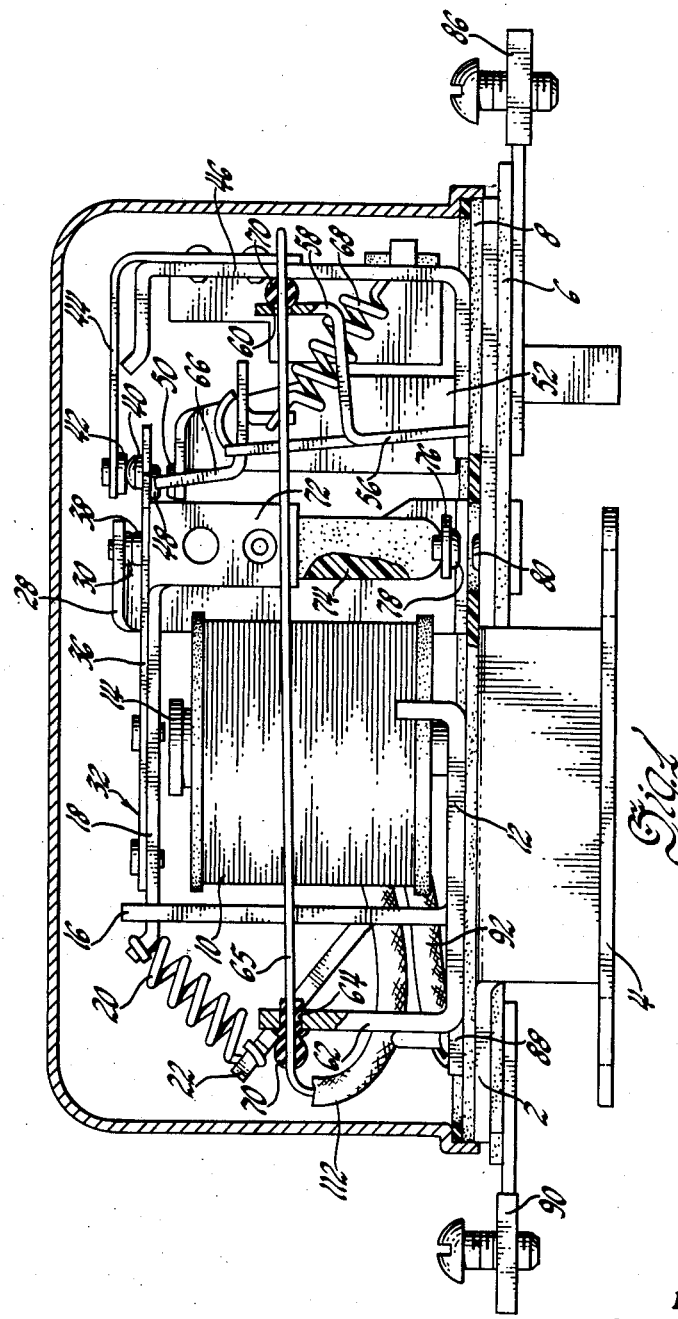
Figure 1 is a vertical sectional view through my control relay taken on line 1—1 of Figure 2.

Referring now more specifically to Figure 1, there is shown a power relay for accomplishing the desired switching between the light controlled unit and the headlamp filaments together with a time delay mechanism to cause one headlamp to switch prior to the other. The delay mechanism in this case includes a hot wire element whose varying length provides the desired switching. The control relay structure incorporates a metallic base having a flat plate section 2 and a flanged supporting foot 4 extending from one side and integral therewith by which the relay is mounted on associated means. Two flat insulated members 6 and 8 are secured on opposite faces of the base 2 upon which are mounted various electrical contacts. The energizing coil 10 of the power relay is mounted upon a supporting frame member 12 seated on the upper insulating plate 8. The core 14 associated with the coil is carried by said member 12 and extends above the upper end of the coil. The supporting frame member 12 has an integral upwardly extending arm 16 lying parallel with the side of the coil 10 and pivotally supporting at its upper end an armature 18. This armature is spring biased away from the core 14 by a biasing spring 20, one end of which is connected to the armature 18 beyond the upright pivotal support 16 and the opposite end of the spring 20 is secured to a bent-out tang 22 extending from the support 12. Thus when the relay coil 10 is energized, the armature 18 is attracted downwardly against the force of the spring 20 and its movement between the two positions provides the desired switching.

Mounted to the right of the coil 10 is a vertical contact support arm 24 which is insulated from the main base 2 but connected through an aperture in said base to a contact terminal 26 supported on the lower face of the assembly. The upper end of the arm 24 is flanged at right angles to the main support and extends over the top of the armature 18 as shown at 28 and carries a switch contact 30. A conductive plate 32 secured to the upper face of the armature 18 has two forwardly extending arms 34 and 36 which extend out to the right as shown in Fig. 1. Arm 34 has attached to its upper surface a contact 38 which is adapted to engage contact 30 carried by the arm 28 for switching purposes. Arm 36 of the conductive member 32 extends parallel to arm 34 and carries at its outer end a contact 40 forming an electrical switch with a mating contact 42 carried by arm 44 which extends over the outer end of arm 36 from a supporting bracket 46. Arm 34 likewise carries on its lower surface at the righthand end beyond contact 38 a contact 48 which is engageable with a contact 50 mounted on the upper end of an arm 52 whose base is attached to the upper surface of insulating plate 8 insulated from the conductive plate 2 and connected to a terminal 54. Thus, in moving from its upper to its lower position, armature 18 opens the two switches formed by contacts 30 and 38 and 40 and 42 and closes the switch formed of contacts 48 and 50.

It is to be noted that since conductive member 32 is provided with two parallel flexible extended arms 34 and 36, the set of switches carried by one arm may be actuated independently of the other. In order to prevent switch 40—42 from opening when the armature 18 is attracted by the energization of coil 10, a movable prop is provided which can be moved under the end of extending arm 36 and the spring flexing of that arm allows it to remain in "switch closed" position when the armature moves down. This movable prop structure consists of an upright member 56, which has two spaced foot portions mounted in the base 2 which are of sufficiently small cross section so that they may flex to provide a pivotal mounting for the vertical member 56. This vertical support 56 has bent out in flanged relation thereto an arm 58 having a remote vertical portion with an opening 60 therein. The supporting bracket 12 for the energizing coil 18 has a further extension and vertical supporting arm 62 at the other end of the base which has an opening 64 in transverse alignment with the opening 60 in the arm 58. A taut expansible conductive wire 65 supported by insulating beads 70 extends through both of these openings 60 and 64 but is insulated therefrom electrically. This resistance wire extends from contact 42 through the two supporting beads between which it is maintained taut to contact 30 as shown by the heavy lines in Fig. 3. When current passes through this wire, it expands or contracts depending upon the temperature, and this expansion and contraction permits the pivotally mounted prop 56 to move back and forth.

A further angular supporting bracket 66 is in turn pivotally mounted on top of the prop 56 for pivotal movement with respect thereto. The vertical arm of member 66 is adapted to lie under and support the extending end of the arm 36 when the assembly is in its lefthand position. A biasing spring 68 is connected to the horizontal arm of the member 66 and to the frame member 46 to tend to keep the arm 66 erect. When the assembly formed of pivotal prop 56 and the extension member 66 is in the erect lefthand position, the upper end of the arm 66 lies under the end of the conductive switch arm 36 and prevents it from moving downwardly when the coil 10 is energized and armature 18 attracted. However, when the hot wire 65 between beads 70 expands due to heat from current flow therethrough, the spring 68 moves the assembly to the right and the upper end of member 66 moves out from under arm 36 and it can then descend as long as the coil 10 is energized to permit opening of switch 40—42.

The armature 18 itself has a vertically depending flange 72 slightly to the left of the end of arm 36 to the lower end of which is secured an extension formed of an insulating arm 74 which is a switch operator. This arm 74 extends downwardly into engagement with a spring arm 76 which extends parallel to the base 2 and is mounted on the lower end of contact supporting arm 24 and is electrically connected thereto but carries on its outer spring end a contact 78 which is adapted to engage a contact 80 on the base plate 2 to ground the same. The righthand end of the hot wire 65 is connected to one side of the frame 46 that supports contact 42 where it is secured by screw 84. The frame 46 is insulated from the base but electrically connected to terminal 86. A contact plate 88 is insulatedly carried by the upper insulating member 8 but electrically connected to terminal 90. Plate 88 is connected through conductor 92 to the energizing coil 10 for the relay and provides one lead for said coil. The other coil lead is connected to the supporting base 12 which is insulatably mounted on the base and connected through suitable electrical connections to terminal 94.

Figure 2:
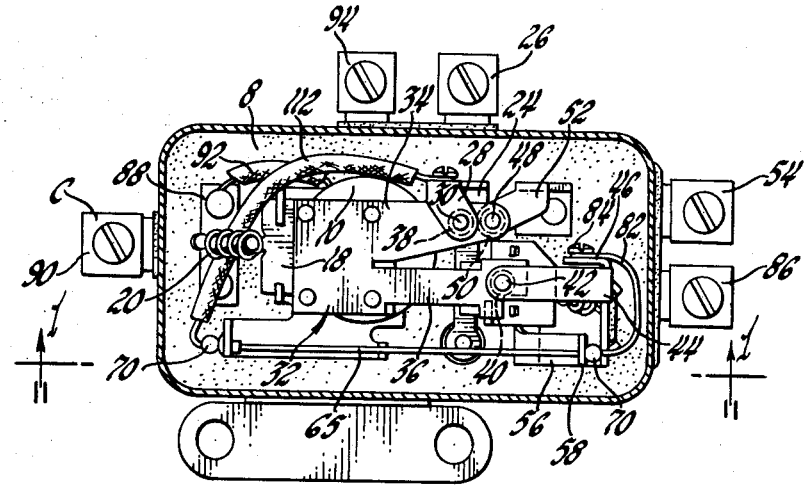
Figure 2 is a top plan view of the control relay of my invention with the outer casing shown in section.
Figure 3:
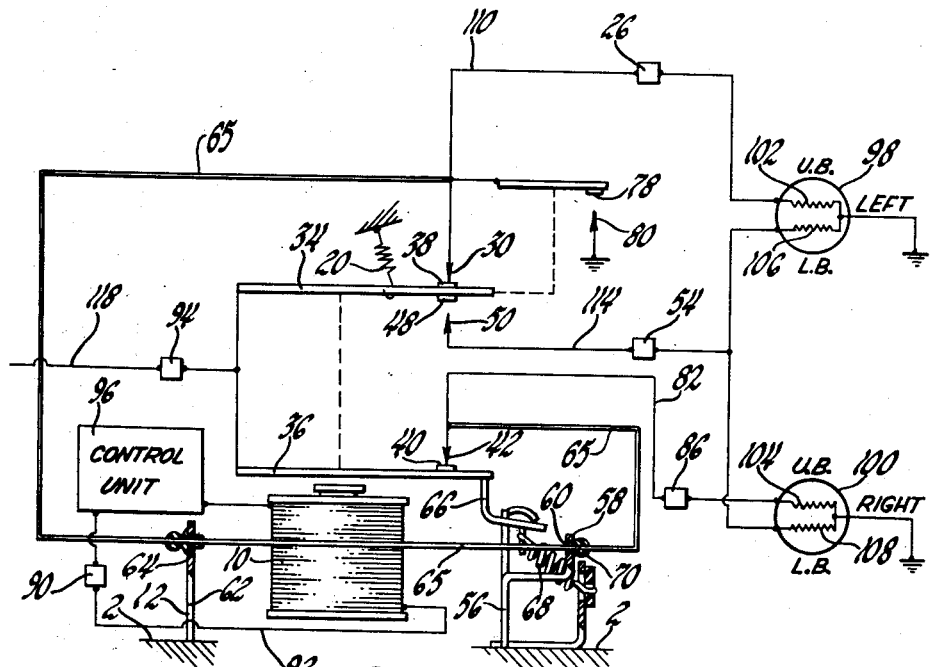
Figure 3 is a circuit diagram of the relay connected in circuit with the light sensitive control and multi-filament headlamps.

Referring now to Figure 3, which is a circuit diagram of connections to the various switches heretofore described with regard to Figures 1 and 2, there is shown therein the energizing coil 10 of the relay which is connected diagrammatically to the light sensitive control unit 96 shown in block diagram. At the righthand side of Figure 3 there are shown the two headlamps 98 and 100, each of which contain an upper beam filament 102 and 104 and a lower beam filament 106 and 108 respectively. One end of each of these four filaments is grounded as shown. The opposite or energizing terminal of upper beam filament 102 is connected through terminal 26 and conductor 110 to contact 30 mounted on arm 28, and engaged by relay arm 34 when in its retracted position. Conductor 110 is likewise connected through conductive support 24 to pivotably movable contact 78 mounted adjacent the floor of the relay which is adapted to engage grounded contact 80 on the frame. Contact 78 is adapted to be simultaneously moved downwardly to engage contact 80 when relay armature 18 is attracted by the relay coil 10. Conductor 110 is likewise lastly connected with one end of the hot wire 65.

The lower beam filament 106 of the left headlamp 98 is connected through terminal 54 and line 114 to stationary contact 50 which is adapted to be engaged by the pivotably movable armature 34 when the same is attracted by the coil 10. Lower beam filament 108 of the right front headlight is also similarly connected to conductor 114. The upper beam filament 104 of the right headlamp is connected to terminal 86 and line 82 which extends both to an upper stationary contact 42 engageable by arm 36 and to the righthand end of the hot wire 65. The various connecting terminals 94, 26, 54 and 86 are shown in each of the conductive lines which they are adapted to connect as small squares to indicate the relationship between the terminals on the relay housing and the parts to which that relay will be connected.

When connected in its proper described relation with the associated apparatus, the relay coil 10 is connected to the light actuated control system indicated as 96 and is adapted to be energized when the lights are switched to low beam and deenergized as long as no light falls on the light sensitive system. Assuming the first condition, i.e., no incident light, the parts will be positioned as shown in Figure 3. In that condition the upper beam filaments 102 and 104 are energized by the following circuit: from supply line 118, terminal connector 94, relay armature 34, upper contact 30, line 110, terminal 26, upper beam filament 102 to ground. The filament 104 is simultaneously energized from line 118, connector 94, armature 36, upper contact 42, connector 82, terminal 86, filament 104 to ground. At the same time, a circuit is completed through the hot wire 65 but this circuit is shunted by the energizing circuit just traced to filament 104 so that the wire does not heat to any appreciable extent.

Assuming now, that incident light increases on the light control circuit 96 due to the approach of a vehicle and causes the latter to switch, energizing relay coil 10, it therefore now attracts its armatures 34, 36. This immediately breaks the circuit between upper contact 30 and armature 34 to deenergize the left upper beam filament 102. However, due to the mechanical support under the righthand end of armature 36 provided by arm 56 and angled arm 66, this portion of the armature is kept from moving downwardly and the right upper beam filament 104 is maintained energized since contact 42 is still engaged. In moving from its upper to lower position, armature 34 not only deenergizes left upper beam filament 102 but completes an energizing circuit to both low beam filaments 106 and 108 through contact 50 and line 114. Thus, momentarily, we have both filaments energized in the right headlamp and the lower beam filament in the left lamp. When armature 34 moves downwardly it likewise, through insulating arm 74, causes contact 78 to move down and engage grounding contact 80. This completes an independent energizing circuit for the hot wire 65 as follows: from line 118, terminal connector 94, armature 36, contact 42, hot wire 65, contact 78, contact 80 to ground. Wire 65 then begins to heat and expand and spring 68 tends to pull the prop assembly out from under its supporting position under the outer end of armature 34. When it has expanded sufficiently, angled arm 66 moves far enough to permit 36 to descend, which breaks the circuit between armature 36 and contact 42, deenergizing the right upper beam filament 104 and also the energizing circiut for the hot wire. The right upper beam is now deenergized and the system is on low beam illumination.

As long as sufficient light falls on the light control circuit 96, the relay coil 10 will be energized. During this time, hot wire 65 will cool, again pulling stilt or prop 56 back to the left, but the angled arm 66 may pivot on the upper end of the prop 56 when it comes into contact on the end of armature 36. When incident light is removed from the light control system 96, armatures 34 and 36 are simultaneously released and moved upwardly due to action of the bias spring 20 and now angle arm 66 can again move under the end of armature 36 to support the same for similar action the next time the system calls for dim illumination. Thus in proceeding from high beam to low beam my control system will delay deenergization of one of the high beam filaments to cause a winking action but will switch simultaneously back to high beams in both lamps.

I claim:

1. In a relay control system, an energizable coil, an armature mounted adjacent said coil and movable through energization thereof, a plurality of independent flexible contact means carried by said armature and movable therewith, stationary conductive contacts mounted adjacent each flexible contact means and forming switches therewith, support means movable under the end of one of the flexible contact means to prevent its moving under certain circumstances and time delay means controlling the movement of the support means to move the latter out of the path of the end of one of the flexible contact means so that the switches may be operated in timed sequence.

2. In relay control switching means, a movable switch arm formed of a plurality of independent flexible sections, electromagnet means for moving the switch arm spaced stationary contacts engageable by each flexible section and forming switch means therewith, abutment means movable into the path of one of the flexible sections to prevent its movement, a single means for moving the movable switch arm, and timed means for moving the abutment means out of the path of the flexible sections so that the various switching means may be operated in sequence.

3. In relay control means, a pivotally mounted armature having a plurality of projecting flexible extensions that may move with respect to each other, stationary contacts engageable by each extension and forming switching means therewith, means movable into and out of the path of one of the flexible extensions to prevent its movement under certain conditions so that a part of the switches may be actuated and a part not actuated when the armature moves, and time delay means connected to the movable means to move it out of the path of the flexible extension a predetermined time after the other flexible extension has moved so that the extensions will be moved in sequence to operate the switching means.

4. In relay switching means, a pivotally movable armature, energizable means for moving said armature, a plurality of flexible conductive fingers mounted on said armature to be moved thereby, stationary contact members mounted in the path of each finger and forming therewith switching means, a movable arm mounted to be moved into the path of one of the fingers to prevent movement thereof so that movement of the armature will cause movement of only a part of the conductive fingers with respect to their associated stationary contacts, and time delay means for moving said movable arm out of the path of the associated conductive finger so that it may move at a predetermined time after the other finger.

5. In relay switching means, a pivotally movable armature, energizable means for moving said armature, a plurality of flexible conductive fingers mounted on said armature to be moved thereby, stationary contact members mounted in the path of each finger and forming therewith switching means, a movable arm mounted to be moved into the path of one of the fingers to prevent movement thereof so that movement of the armature will cause movement of only part of the conductive fingers with respect to their associated stationary contacts, an expandable hot wire connected to said movable arm, biasing means also connected to said arm in opposition to the hot wire to maintain the latter taut and conductive means to apply voltage to said hot wire and said energizable means so that upon movement of the armature the wire will expand in a predetermined time to cause the movable arm to move out of the path of its associated finger.

6. A relay actuated sequence switch comprising a relay including an energizing coil and an armature, a first movable contact supported by the armature, a first fixed contact mounted adjacent the armature for engagement by the first movable contact upon displacement of the armature, a second movable contact resiliently supported by the armature, a movable abutment adapted for motion into and out of the path of movement of the second movable contact, a second fixed contact mounted adjacent the armature for engagement by the second movable contact, and time delay means connected with said abutment for displacement thereof and circuit means connected with said first fixed and movable contacts and connected with the time delay means for energization thereof.

References Cited in the file of this patent

UNITED STATES PATENTS

| 1,763,006 | Murphy | June 10, 1930 |
| 2,177,832 | Knos | Oct. 31, 1939 |
| 2,842,638 | Digirolamo | July 8, 1958 |

FOREIGN PATENTS

| 347,959 | Great Britain | May 7, 1931 |
| 475,870 | Germany | May 4, 1929 |